United States Patent
Weindorf et al.

(10) Patent No.: US 11,679,679 B2
(45) Date of Patent: Jun. 20, 2023

(54) FLOATING-INFORMATION DISPLAY

(71) Applicant: Visteon Global Technologies, Inc., Van Buren Township, MI (US)

(72) Inventors: Paul Fredrick Luther Weindorf, Novi, MI (US); Pawel Murzyn, Chelmsford (GB); Qais Sharif, Northville, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 1 day.

(21) Appl. No.: 17/508,231

(22) Filed: Oct. 22, 2021

(65) Prior Publication Data

US 2023/0128022 A1   Apr. 27, 2023

(51) Int. Cl.
| | |
|---|---|
| *G02B 5/30* | (2006.01) |
| *G02B 30/56* | (2020.01) |
| *G02B 30/00* | (2020.01) |
| *G02B 27/00* | (2006.01) |
| *B60K 37/02* | (2006.01) |
| *H04N 13/302* | (2018.01) |

(52) U.S. Cl.
CPC ............ *B60K 37/02* (2013.01); *G02B 5/3066* (2013.01); *B60K 2370/1529* (2019.05); *B60K 2370/1531* (2019.05); *G02B 27/0018* (2013.01); *G02B 30/00* (2020.01); *G02B 30/56* (2020.01); *H04N 13/302* (2018.05)

(58) Field of Classification Search
CPC ............ B60K 37/02; B60K 2370/1529; B60K 2370/1531; G02B 5/3066; G02B 30/00; G02B 30/56; H04N 13/302
See application file for complete search history.

(56) References Cited

U.S. PATENT DOCUMENTS

2004/0169619 A1   9/2004 Hata et al.
2008/0284792 A1   11/2008 Bell et al.
(Continued)

FOREIGN PATENT DOCUMENTS

WO   2012147642 A1   11/2012
WO   2019150129 A1   8/2019

OTHER PUBLICATIONS

Yamane et al., "Fabrication and Evaluation of Dihedral Corner Reflector Array for floating image manufactured by synchrotron radiation," 2015 International Conference on Electronics Packaging and iMAPS All Asia Conference (ICEP-IAAC), Kyoto, 2015, (Year: 2015).

*Primary Examiner* — Douglas M Wilson
(74) *Attorney, Agent, or Firm* — Quinn IP Law (57) ABSTRACT

A floating-information display includes a first quarter-wave retarder disposed on a side of an optical plate. A reflective polarizer is disposed between the first quarter-wave retarder and the optical plate. A first display is configured to transmit a first image along a first axis through the first quarter-wave retarder to the reflective polarizer. The reflective polarizer redirects the first image along a second axis through the first quarter-wave retarder toward a viewer. The first image appears to the viewer to be oriented normal to the second axis and at a first location. A second display is configured to transmit a second image to the optical plate. The second image is transferred through the first quarter-wave retarder along the second axis toward the viewer. The second image appears to the viewer to be oriented normal to the second axis and at a second location.

20 Claims, 7 Drawing Sheets

(56) References Cited

U.S. PATENT DOCUMENTS

| | | |
|---|---|---|
| 2009/0242142 A1 | 10/2009 | Bellwood et al. |
| 2011/0085182 A1 | 4/2011 | Shiota et al. |
| 2011/0181949 A1 | 7/2011 | Hashikawa |
| 2012/0062846 A1* | 3/2012 | Dike ................. G02B 27/0101 353/121 |
| 2014/0110040 A1 | 4/2014 | Cok |
| 2018/0063520 A1* | 3/2018 | Chung ................ H04N 13/346 |
| 2018/0259810 A1* | 9/2018 | Numata ............ G02F 1/133528 |
| 2019/0235238 A1 | 8/2019 | Choi et al. |
| 2020/0033618 A1 | 1/2020 | Li et al. |
| 2020/0050009 A1 | 2/2020 | Saitoh et al. |
| 2020/0183183 A1* | 6/2020 | Oyama ................. G03B 21/26 |
| 2020/0218044 A1 | 7/2020 | Weindorf |
| 2021/0103161 A1* | 4/2021 | Daiku .................... G02B 5/124 |
| 2021/0173218 A1* | 6/2021 | Hamano ............. G02F 1/13338 |
| 2022/0373818 A1* | 11/2022 | Ashimine ............ G02B 27/283 |
| 2022/0397762 A1* | 12/2022 | Bae ...................... G03H 1/0005 |
| 2022/0397862 A1* | 12/2022 | Karafin .............. G02B 27/0093 |

* cited by examiner

_Fig-1_

_Fig-2_

FLOATING-INFORMATION DISPLAY

TECHNICAL FIELD

The present disclosure generally relates to systems and methods for a floating-information display.

BACKGROUND

Instrument panels may include clusters of gauges, with each gauge presenting operationally relevant information to a system user. An instrument panel may be positioned within a field of view of the user. The individual gauges are configured to convey particular pieces of information, such as a remaining fuel level, current speed and heading, and ambient, external, and/or component-level temperature, etc.

Early instrument panels employed gauge clusters that operated primarily as analog devices. In a motor vehicle context, for instance, analog speedometers and fuel gauges may have an indicator, such as a needle or a pointer, that is physically moved by a corresponding input between defined lower and upper range limits. In contrast to analog gauges, modern digital gauges may include transducers or other sensors that output electrical signals to a microprocessor. The electrical signals may be proportional to the measured value, e.g., a proportional voltage signal. In response to such signals, the microprocessor automatically adjusts a corresponding digital readout on one or more displays to the user (e.g., a graphical icons, images, and/or text). Light from the digital gauges is often limited in brightness due to internal reflections within the displays.

SUMMARY

A floating-information display is provided herein. The floating-information display includes an optical plate, a first quarter-wave retarder, a reflective polarizer, a first display, and a second display. The optical plate has a first side and a second side opposite the first side. The first quarter-wave retarder is disposed on the second side of the optical plate. The reflective polarizer is disposed between the first quarter-wave retarder and the second side of the optical plate.

The first display is disposed on the second side of the optical plate and aligned with the first quarter-wave retarder. The first display is configured to transmit a first image along a first axis through the first quarter-wave retarder to the reflective polarizer. The reflective polarizer is configured to redirect the first image along a second axis through the first quarter-wave retarder toward a viewer. The first image appears to the viewer to be oriented normal to the second axis and at a first location on the first side of said optical plate. The second axis is orthogonal to the first axis.

The second display is disposed on the first side of the optical plate and aligned with the optical plate. The second display is configured to transmit a second image to the first side of the optical plate. The second image is transferred through the first quarter-wave retarder along the second axis toward the viewer. The second image appears to the viewer to be oriented normal to the second axis and at a second location. The second location of the second image is spatially offset from the first location of the first image.

In one or more embodiments of the floating-information display, the optical plate is configured to generate a ghost image by an internal reflection of the first image on the first side of the optical plate. The ghost image is presented out of the first quarter-wave retarder along the second axis toward the viewer. A polarization of light that forms the first image while in the optical plate causes an intensity of the ghost image to be less than 1 percent of the first image as seen by the viewer.

In one or more embodiments of the floating-information display, a polarization of light that forms the first image and reaches the reflective polarizer through the first quarter-wave retarder causes the first image to be reflected by at least 50 percent by the reflective polarizer toward the viewer.

In one or more embodiments of the floating-information display, a polarization of light that forms the second image and reaches the reflective polarizer through the optical plate causes the second image to be transferred by at least 90 percent through the reflective polarizer toward the viewer.

In one or more embodiments of the floating-information display, the optical plate is a clear plate. The second display has a face that is oriented normal to the second axis. The second location of the second image appears to the viewer to be at a second face of the second display. The first location of the first image is between the second location and the clear plate.

In one or more embodiments of the floating-information display, the optical plate is a transmissive dihedral corner reflector array. The second display has a face that is oriented normal to the first axis. The second location of the second image is between the transmissive dihedral corner reflector array and the viewer.

In one or more embodiments of the floating-information display, the first image and the second image are circularly polarized upon leaving the first quarter-wave retarder toward the viewer.

In one or more embodiments of the floating-information display, a ghost image of the first image generated by a reflection internal to the optical plate is circularly polarized upon leaving the first quarter-wave retarder toward the viewer.

In one or more embodiments, the floating-information display includes a second quarter-wave retarder disposed between the first quarter-wave retarder and the first display, oriented normal to the first axis, and configured to change a polarization of the first image. The reflective polarizer reflects at least 99 percent of the first image toward the viewer.

In one or more embodiments, the floating-information display includes a film disposed on the second display and configured to restrict a light of the second image to within approximately 20 degrees from the first axis.

A method for generating two images with a floating-information display is provided herein. The method includes transmitting a first image from a first display along a first axis through a first quarter-wave retarder to a reflective polarizer. The first quarter-wave retarder is disposed on a second side of an optical plate. The optical plate has a first side and the second side that is opposite the first side. The reflective polarizer is disposed between the first quarter-wave retarder and the second side of the optical plate.

The first display is disposed on the second side of the optical plate and aligned with the first quarter-wave retarder. The method includes redirecting the first image with the reflective polarizer along a second axis through the first quarter-wave retarder toward a viewer. The first image appears to the viewer to be oriented normal to the second axis and at a first location on the first side of said optical plate. The second axis is orthogonal to the first axis.

The method further includes transmitting a second image from a second display to the first side of the optical plate. The second display is disposed on the first side of the optical plate and is aligned with the optical plate. The method includes transferring the second image through the first quarter-wave retarder along the second axis toward the viewer. The second image appears to the viewer to be oriented normal to the second axis and at a second location. The second location of the second image is spatially offset from the first location of the first image.

In one or more embodiments, the method includes generating a ghost image by an internal reflection of the first image on the first side of the optical plate. The ghost image is presented out of the first quarter-wave retarder along the second axis toward the viewer. A polarization of light that forms the first image while in the optical plate causes an intensity of the ghost image to be less than 1 percent of the first image as seen by the viewer.

In one or more embodiments of the method, a polarization of light that forms the first image and reaches the reflective polarizer through the first quarter-wave retarder causes the first image to be reflected by at least 50 percent by the reflective polarizer toward the viewer.

In one or more embodiments of the method, a polarization of light that forms the second image and reaches the reflective polarizer through the optical plate causes the second image to be transferred by at least 90 percent through the reflective polarizer toward the viewer.

In one or more embodiments of the method, the optical plate is a clear plate. The second display has a face that is oriented normal to the second axis. The second location of the second image appears to the viewer to be at a second face of the second display. The first location of the first image is between the second location and the clear plate.

In one or more embodiments of the method, the optical plate is a transmissive dihedral corner reflector array. The second display has a face that is oriented normal to the first axis. The second location of the second image is between the transmissive dihedral corner reflector array and the viewer.

In one or more embodiments of the method, the first image and the second image are circularly polarized upon leaving the first quarter-wave retarder toward the viewer.

In one or more embodiments of the method, a ghost image of the first image generated by a reflection internal to the optical plate is circularly polarized upon leaving the first quarter-wave retarder toward the viewer.

In one or more embodiments of the method, a second quarter-wave retarder is disposed between the first quarter-wave retarder and the first display, and oriented normal to the first axis, and is configured to change a polarization of the first image. The method includes reflecting at least 99 percent of the first image toward the viewer with the reflective polarizer.

An instrument panel is provided herein. The instrument panel includes an electronic control unit and a floating-information display in electrical communication with the electronic control unit. The floating-information display includes an optical plate, a first quarter-wave retarder, a reflective polarizer, a first display, and a second display. The optical plate has a first side and a second side opposite the first side. The first quarter-wave retarder is disposed on the second side of the optical plate. The reflective polarizer is disposed between the first quarter-wave retarder and the second side of the optical plate.

The first display is disposed on the second side of the optical plate and aligned with the first quarter-wave retarder. The first display is configured to transmit a first image along a first axis through the first quarter-wave retarder to the reflective polarizer. The reflective polarizer is configured to redirect the first image along a second axis through the first quarter-wave retarder toward a viewer. The first image appears to the viewer to be oriented normal to the second axis and at a first location on the first side of said optical plate. The second axis is orthogonal to the first axis.

The second display is disposed on the first side of the optical plate and aligned with the optical plate. The second display is configured to transmit a second image to the first side of the optical plate. The second image is transferred through the first quarter-wave retarder along the second axis toward the viewer. The second image appears to the viewer to be oriented normal to the second axis and at a second location. The second location of the second image is spatially offset from the first location of the first image.

The above features and advantages and other features and advantages of the present teachings are readily apparent from the following detailed description of the best modes for carrying out the teachings when taken in connection with the accompanying drawings.

The present disclosure may have various modifications and alternative forms, and some representative embodiments are shown by way of example in the drawings and will be described in detail herein. Novel aspects of this disclosure are not limited to the particular forms illustrated in the above-enumerated drawings. Rather, the disclosure is to cover modifications, equivalents, and combinations falling within the scope of the disclosure as encompassed by the appended claims.

DETAILED DESCRIPTION

An avatar may be a static or moving image, or other graphic representation, that is associated with a specific digital display object. Embodiments of the present disclosure may provide an avatar, or other midair floating object, in front of a normal instrument cluster display. The floating transparent avatar may interact with the driver to provide information and cues (e.g., alerts) to the driver in a manner that would not obstruct the view of the instrument cluster display. As an example, the avatar of a person sending a text message could speak to the driver and provide a verbal text message thus providing a more natural user experience. In addition, blinkers, other telltales, or information may pop up in front of the normal cluster image.

Embodiments of the disclosure generally provide for a digital display cluster concept that projects floating information in space in front of regular digital cluster information. The concept of floating information in front of the regular digital cluster information offers a host of use case scenarios. The digital display cluster generally uses a reflective polarizer film with a quarter-wave retarder film. The films may also be used to realize a dual display concept where the image planes of two floating information planes are separated by a small distance to realize the appearance of a three-dimensional display.

Figure 1:
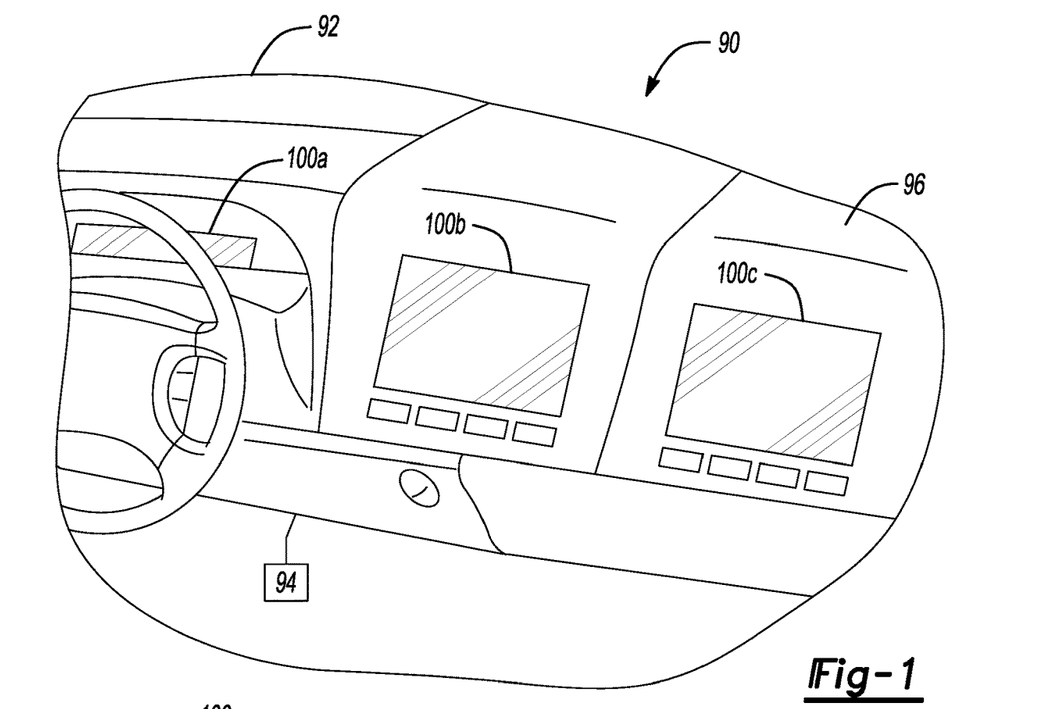
FIG. 1 illustrates a context of a platform.

FIG. 1 illustrates a context of a platform 90. The platform 90 generally includes a body 92, an electronic control unit 94, and an instrument panel 96 having one or more displays 100a-100c. The body 92 may implement a body of a vehicle. The vehicle may include mobile vehicles such as automobiles, trucks, motorcycles, boats, trains and/or aircraft. In some embodiments, the body 92 may be part of a stationary object. The stationary objects may include, but are not limited to, billboards, kiosks and/or marquees. Other types of platforms 90 may be implemented to meet the design criteria of a particular application.

The electronic control unit 94 may implement one or more display-driver circuits. The electronic control unit 94 is generally operational to generate control signals that drive the displays 100a-100c. In various embodiments, the control signals may be configured to provide instrumentation (e.g., speed, tachometer, fuel, temperature, etc.) to at least one of the displays 100a-100c (e.g., 100a). In some embodiments, the control signals may also be configured to provide video (e.g., a rear-view camera video, a forward-view camera video, an onboard DVD player, etc.) to the displays 100a-100c. In other embodiments, the control signals may be further configured to provide alphanumeric information shown on one or more of the displays 100a-100c.

In various embodiments, the electronic control unit 94 generally comprises at least one microcontroller. The at least one microcontroller may include one or more processors, each of which may be embodied as a separate processor, an application specific integrated circuit (ASIC), a field programmable gate array (FPGA), or a dedicated electronic control unit.

The at least one microcontroller may be any sort of electronic processor (implemented in hardware, software executing on hardware, or a combination of both). The at least one microcontroller may also include tangible, non-transitory memory, (e.g., read-only memory in the form of optical, magnetic, and/or flash memory). For example, the at least one microcontroller may include application-suitable amounts of random-access memory, read-only memory, flash memory and other types of electrically-erasable programmable read-only memory, as well as accompanying hardware in the form of a high-speed clock or timer, analog-to-digital and digital-to-analog circuitry, and input/output circuitry and devices, as well as appropriate signal conditioning and buffer circuitry.

Computer-readable and executable instructions embodying the present method may be stored in the memory and executed as set forth herein. The executable instructions may be a series of instructions employed to run applications on the at least one microcontroller (either in the foreground or background). The at least one microcontroller may receive commands and information, in the form of one or more input signals from various controls or components in the platform 90 and communicate instructions to the displays 100a-100c through one or more control signals to control the displays 100a-100c.

The instrument panel 96 implements a structure (or instrument cluster) that supports the displays 100a-100c. As illustrated, the display 100a may be a cluster display positioned for use by a driver. The display 100b may be a console display positioned for use by the driver and a passenger. The display 100c may be a passenger display positioned for use by the passenger.

The displays 100a-100c are generally mounted to the instrument panel 96. In various embodiments, one or more of the displays 100a-100c may be disposed inside the platform (e.g., vehicle) 90. In other embodiments, one or more of the displays 100a-100c may be disposed on an exterior of the platform 90. One or more of the displays 100a-100c may implement a floating-information capability or a three-dimensional display capability. Control signals used to generate images on the displays 100a-100c may be received as electrical communications from the electronic control unit 94.

Figure 2:
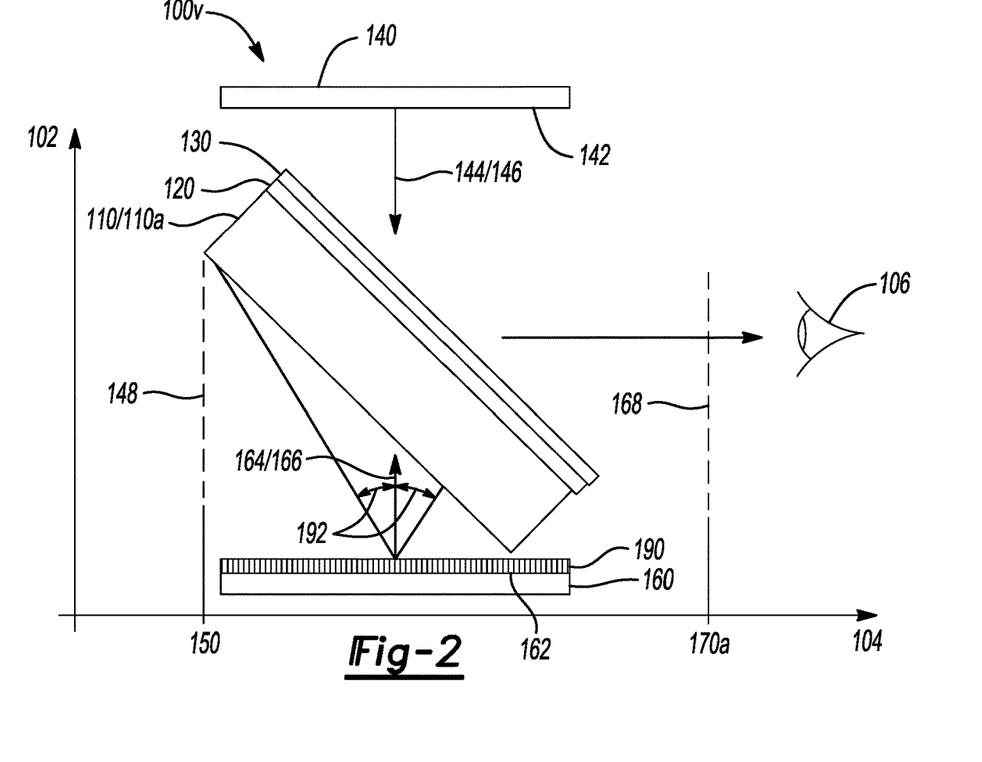
FIG. 2 illustrates a first floating-information display in accordance with one or more exemplary embodiments.

FIG. 2 illustrates an example first floating-information display 100v in accordance with one or more exemplary embodiments. The first floating-information display 100v may be representative of one or more of the displays 100a-100c. Orientation of the first floating-information display 100v may be described in terms of a first (e.g., a vertical) axis 102 and a second (e.g., a horizontal) axis 104. The first axis 102 is orthogonal to the second axis 104. A viewer 106 (e.g., the driver, the passenger and/or someone else) of the first floating-information display 100v may be disposed to one side of the first floating-information display 100v. By way of example, the viewer 106 may be the driver of the vehicle (e.g., platform) 90 where the first floating-information display 100v represents the display 100a. In another example, the viewer 106 may be the passenger of the vehicle 90 where the first floating-information display 100v represents the display 100c, and so on.

The first floating-information display (or circuit) 100v generally comprises an optical plate 110, a reflective polarizer 120, a first quarter-wave retarder 130, a first display 140, a second display 160, and an optional film 190. The first display 140 may transmit a first light 144 from a first face 142. The first light 144 is directed along the first axis 102 (e.g., −Y direction) and conveys a first image 146. The first light 144/first image 146 are redirected by the reflective polarizer 120 from the first axis 102 to the second axis 104 toward the viewer 106 (e.g., +X direction). The second display 160 may transmit a second light 164 from a second face 162. The second light 164 is directed along the first axis (e.g., +Y direction) and conveys a second image 166. The second light 164/second image 166 are redirected by the optical plate 110 from the first axis 102 to the second axis 104 toward the viewer 106 (e.g., the +X direction).

The optical plate 110 may implement a micro-mirror array (e.g., a transmissive dihedral corner reflector array 110a). The optical plate 110 is operational to redirect the second light 164/second image 166 from the first axis 102 to the second axis 104. The optical plate 110 is disposed at an angle (e.g., approximately 45 degrees) relative to the second axis 104. The optical plate 110 may have a first side that faces toward the second display 160 and a second side that faces toward the first display 140.

The reflective polarizer 120 implements a multi-layer polarizer. The multi-layer polarizer type may include, but is not limited to, a reflective polarizer mirror (RPM) type available from 3M Corporation of Maplewood, Minn., a direct lamination reflective polarizer (DLRP) type available from 3M Corporation, or a wire grid polarizer type available from MeCan Imaging, Inc. of Saitama, Japan. The reflective polarizer 120 has a transmission axis and a blocking axis. Most (e.g., about 90%) of polarized light is transmitted when the polarized light is aligned to the transmission axis of the reflective polarizer 120. Approximately all (e.g., almost 100%) of the polarized light is reflected (or the light transmission is blocked) where the polarized light is aligned to the blocking axis. The reflective polarizer 120 is disposed between the first quarter-wave retarder 130 and the second side of the optical plate 110. A third side of the reflective polarizer 120 may face the second side of the optical plate 110. A fourth side of the reflective polarizer 120 may face the first quarter-wave retarder 130.

The first quarter-wave retarder 130 implements a quarter-wave plate. The first quarter-wave retarder 130 is operational to change polarization of the light passing through. Where the light enters the first quarter-wave retarder 130 with a linear polarization, the light leaves the first quarter-wave retarder 130 with a circular polarization. Where the light enters the first quarter-wave retarder 130 with a circular polarization, the light leaves the first quarter-wave retarder 130 with a linear polarization. The first quarter-wave retarder 130 is disposed on the fourth side of the reflective polarizer 120 (e.g., on the second side of the optical plate 110). The first quarter-wave retarder 130 has a fifth side that faces the reflective polarizer 120 and a sixth side that faces and is aligned with the first display 140.

The first display 140 implements a light-emitting display. The first display 140 is operational to generate the first image 146 in response to signals from the electronic control unit 94. In various configurations, the first display 140 may implement a color display. In other configurations, the first display 140 may implement a black-and-white display. Embodiments of the first display 140 may include, but are not limited to, a Light Emitting Diode (LED) display, an Organic Light Emitting Diode (OLED) display, a Thin Film Transistor (TFT) display, a Liquid Crystal Display (LCD), a Plasma Display Panel (PDP), and the like. The first image 146 may be a dynamic image (e.g., a video sequence). The first display 140 is disposed on the second side of the optical plate 110 and aligned with the first quarter-wave retarder 130.

As seen from a point of view of the viewer 106, the first image 146 appears to be a first floating image 148 at a first location 150 along the second axis 104. In particular, the first location 150 is located on an opposite side of the optical plate 110, the reflective polarizer 120, and the first quarter-wave retarder 130 as the viewer 106. The first floating image 148 is oriented normal to the second axis with a "top" of the first floating image 148 oriented right side up.

The second display 160 implements another light-emitting display. The second display 160 is operational to generate the second image 166 in response to signals from the electronic control unit 94. In various configurations, the second display 160 may implement a color display. In other configurations, the second display 160 may implement a black-and-white display. Embodiments of the second display 160 may include, but are not limited to, a Light Emitting Diode (LED) display, an Organic Light Emitting Diode (OLED) display, a Thin Film Transistor (TFT) display, a Liquid Crystal Display (LCD), a Plasma Display Panel (PDP), and the like. The second image 166 may be a dynamic image (e.g., another video sequence). The second display 160 is disposed on the first side of the optical plate 110 and is aligned with the optical plate 110.

As seen from a point of view of the viewer 106, the second image 166 appears to be a second floating image 168 at a second location 170a along the second axis 104. The second location 170a is located between the viewer 106 and the first quarter-wave retarder 130. The second floating image 168 is oriented normal to the second axis with a "top" of the second floating image 168 oriented right side up. The second floating image 168 is physically offset from the first floating image 148 by a fixed distance along the second axis. As illustrated, the second floating image 168 appears to the viewer 106 to be spatially located in front of the first floating image 148.

The optional film 190 implements a light control film. In other embodiments, the film 190 may be a retardation plate and an analyzing polarizer. The film 190 is operational to restrict the second light 164/second image 166 to within angles 192 to minimize a creation of ghost images. In various embodiments, the angles 192 may be 20 degrees from the normal to the second display 160. Other angles 192 may be implemented to meet the design criteria of a particular application.

The first floating-information display 100v generally presents a high resolution instrument cluster display to the viewer 106. The first display 140 may create a high resolution first floating image 148. The second display 160 creates the second floating image 168 in front of the first floating image 148 as seen by the viewer 106. The second floating image 168 may have a lower image quality than the first floating image 148 in embodiments where the optical plate 110 is a transmissive dihedral corner reflector array 110a.

Figure 3:
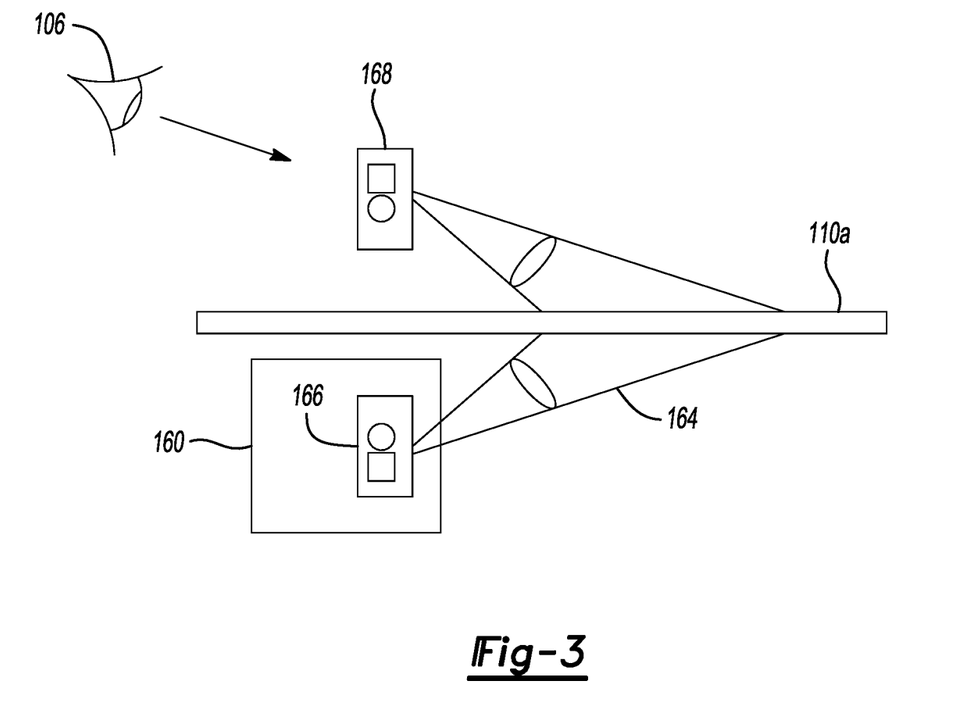
FIG. 3 illustrates a floating-image formation technique in accordance with one or more exemplary embodiments.

FIG. 3 illustrates an example floating-image formation technique in accordance with one or more exemplary embodiments. The optical plate 110 may be implemented as a transmissive dihedral corner reflector array 110a. The transmissive dihedral corner reflector array 110a may be an ASKA3D-Plate, available from Asukanet Company, Ltd. of Hiroshima, Japan. The transmissive dihedral corner reflector array 110a does not rely on a mist-like invisible screen or dedicated glasses to see projected images. The transmissive dihedral corner reflector array 110a collects the light emitted by objects within an originating space, and disperses the collected light to an imaging space. Thus, an image of an object appears in the imaging space as if the light was emitted by the actual object in the originating space. Therefore, the original image plane is reconstructed in midair at a distance from the dihedral corner reflector array 110a that matches the distance of the original image from the dihedral corner reflector array 110a.

As illustrated in the figure, the second display 160 creates the second light 164 that conveys the second image 166. The second light 164 is redirected by the dihedral corner reflector array 110a as the second light 164 passes through the dihedral corner reflector array 110a. While being redirected by the dihedral corner reflector array 110a, the second light 164 is focused to form the second floating image 168. The second floating image 168 is located on an opposite side of the dihedral corner reflector array 110a as the original second image 166. The viewer 106 subsequently sees the second floating image 168 without directly looking at the second display 160.

A clarity and a resolution of the second floating image 168 may be reduced from the original second image 166 due to a finite resolution of the dihedral corner reflector array 110a. Therefore in such configurations, a high resolution instrument cluster image (e.g., the first image 146) may be generated by the first display 140 and the second display 160 may generate the avatar display images (e.g., the second image 166). The avatar display images may be used for projecting driver cues such as blinker signals, warnings, navigation information, and/or a floating interactive avatar in midair.

Figure 4:
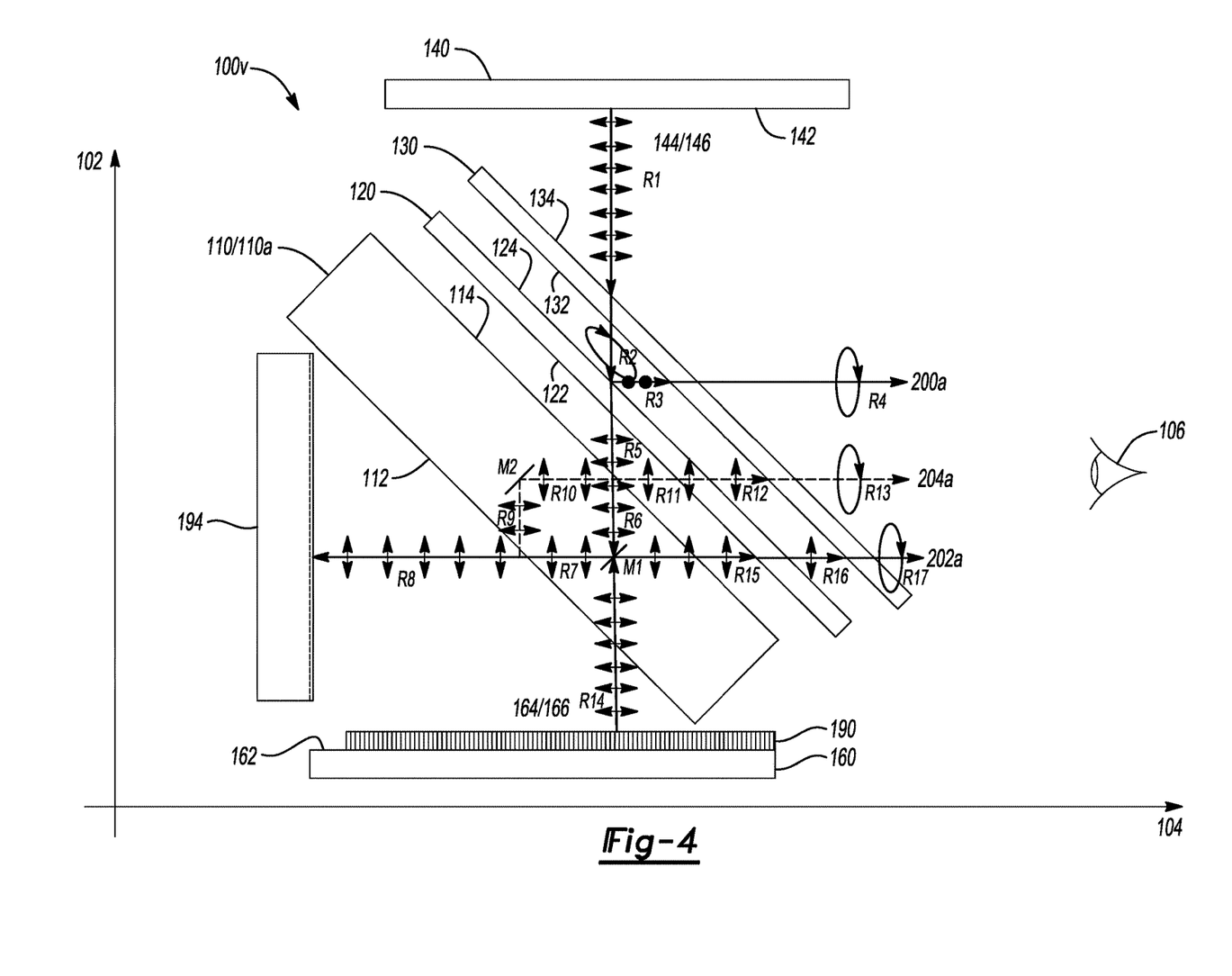
FIG. 4 illustrates a ray trace schematic of the first floating-information display in accordance with one or more exemplary embodiments.

FIG. 4 illustrates an example ray trace schematic of the first floating-information display 100v in accordance with one or more exemplary embodiments. The first floating-information display 100v generally includes the optical plate 100/transmissive dihedral corner reflector array 110a, the reflective polarizer 120, the first quarter-wave retarder 130, the first display 140, the second display 160, the film 190, and a light trap 194. The optical elements are shown arranged relative to the first axis 102 and the second axis 104. Spacing is shown between the optical elements for easier explanation of the ray traces. The refraction angles are not depicted for simplicity. A ghost image created by the first floating-information display 100v is minimized by using the reflective polarizer 120 in combination with the first quarter-wave retarder 130.

The transmissive dihedral corner reflector array 110a has a first side (or surface) 112 and a second side (or surface) (or surface) 114. The first side 112 is opposite the second side 114. The first side 112 may face the second display 160 and the light trap 194. The transmissive dihedral corner reflector array 110a also includes multiple internal reflective surfaces. The internal reflective surfaces are represented by mirrors M1 and M2.

The reflective polarizer 120 has a third side (or surface) 122 and a fourth side (or surface) 124. The third side 122 is opposite the fourth side 124. The third side 122 of the reflective polarizer 120 faces the second side 114 of the transmissive dihedral corner reflector array 110a.

The first quarter-wave retarder 130 has a fifth side (or surface) 132 and a sixth side (or surface) 134. The fifth side 132 is opposite the sixth side 134. The fifth side 132 faces the fourth side 124 of the reflective polarizer 120.

The first display 140 has a first face 142. The first light 144/first image 146 are transmitted from the first face 142 of the first display 140 toward the sixth side 134 of the first quarter-wave retarder 130. The first light 144/first image 146 are illustrated as a ray R1. The first light 144 has a vertical polarization, represented by double arrows.

The second display 160 has a second face 162. The second light 164/second image 166 are transmitted from the second face 162 of the second display 160 and through the film 190 toward the first side 112 of the transmissive dihedral corner reflector array 110a. The second light 164/second image 166 are illustrated as a ray R14. The second light 164 has the vertical polarization, represented by the double arrows.

The light trap 194 may be implemented as a black diffused surface or barrier. The light trap 194 may be disposed along the second axis 104 on an opposite side of the transmissive dihedral corner reflector array 110a as the viewer 106.

The transmissive dihedral corner reflector array 110a generally preserves polarization of light passing through. A glass version of the transmissive dihedral corner reflector array 110a preserves polarization whereas a plastic version does not preserve the polarization. Therefore, if the second display 160 is vertically polarized, the output of the projected display is vertically polarized if the reflective polarizer 120 is not included. Therefore, when the reflective polarizer 120 has the transmission axis aligned with the vertical polarization of the second display 160, almost all of the light exiting the transmissive dihedral corner reflector array 110a will be transmitted through the reflective polarizer 120 and little or no color shifts will be visible in the second floating image 168 (FIG. 3).

For the transmitted light through the reflective polarizer 120, the first quarter-wave retarder 130 changes the vertically polarized light to circularly polarized light, illustrated by an oval with an arrow. The first quarter-wave retarder 130 may be applied separately to the reflective polarizer 120, but may also be implemented as a combined reflective polarizer plus retarder film, such as an APF-QWP film available from 3M Corporation. About 90 percent of the light is transmitted where the polarized light is aligned to the transmission axis of the reflective polarizer 120. Where the polarized light is aligned to the blocking axis, almost 100 percent of the light is reflected (or blocked).

Another principle of operation is that the polarization is preserved when a glass-type transmissive dihedral corner reflector array 110a is utilized in the design. Any antireflective films on the first side 112 of the transmissive dihedral corner reflector array 110a and on the second face 162 of the second display 160 should be non-birefringent, such as a triacetylcellulose (TAC) substrate based AR100 film from Dexerials America Corporation, Suwanee, Ga. Benefits of using the antireflective films are improved light transmission, reduction of ghost images, and providing a darker background for the floating images due to less ambient light reflection.

A ray R1 is emitted from the first display 140 with the vertical polarization as, depicted by the double arrow. Most automotive in-plane-switching displays use a front polarizer with a vertical transmission axis. The ray R1 passes through the first quarter-wave retarder 130 and is transformed into substantially circular polarization, as depicted by the ovals, as a ray R2. Due to the non-normal angle of the first quarter-wave retarder 130 relative to the ray R1, the light passing through the first quarter-wave retarder 130 causes some elliptical polarization.

Approximately half the circularly polarized light from the ray R2 that reaches the third side 122 of the reflective polarizer 120 passes through the reflective polarizer 120 as a ray R5. The other half of the ray R2 (e.g., approximately 50 percent) is reflected by the reflective polarizer 120 as a ray R3. The ray R3 is horizontally polarized light (e.g., polarized 90 degrees relative to the vertical polarization) that passes through the first quarter-wave retarder 130. The ray R3 is transformed by the first quarter-wave retarder 130 into substantially circularly polarized light as a ray R4. The ray R4 continues on to the viewer 106 as a first display image 200a. The polarization angle of the ray R3 is oriented at 90 degrees relative to the polarization angle of the ray R1, as shown by the black dots.

The second light 164/second image 166 is emitted from the second face 162 of the second display 160 as a ray R14 with the vertical polarization. The ray 14 enters the transmissive dihedral corner reflector array 110a through the first side 112. The dihedral mirrors within the transmissive dihedral corner reflector array 110a, depicted as a mirror M1, reflect the ray R14 into a ray R15 while preserving the vertical polarization. The ray R15 is vertically polarized light that passes through the reflective polarizer 120 to become a ray R16. The ray R16 is transformed into substantially circularly polarized light by first quarter-wave retarder 130 as a ray R17. The ray R17 continues on to the viewer 106 as a second display image 202a.

From a ghost image perspective, the ray R5 that is transferred through the reflective polarizer 120 enters the transmissive dihedral corner reflector array 110a as a ray R6. The dihedral mirrors within the transmissive dihedral corner reflector array 110a, depicted as the mirror M1, reflect the ray R6 into a ray R7 while preserving the vertical polarization. Most of the ray R7 passes out of the transmissive dihedral corner reflector array 110a through the first side 112 as a ray R8. The ray R8 is absorbed by the light trap 194. A portion of the ray R7 is reflected into a ray R9 via total internal reflection within the transmissive dihedral corner reflector array 110a. Because the light in the ray R7 is vertically polarized, a small amount is reflected internally. The amount of reflection as a function of an incident angle $\theta_1$ is described by equations 1 and 2 as follows:

$$R_{p12}(\theta_1) = \left[\frac{\eta^2\cos\theta_1 - \sqrt{\eta^2 - \sin^2\theta_1}}{\eta^2\cos\theta_1 + \sqrt{\eta^2 - \sin^2\theta_1}}\right]^2 \quad (1)$$

$$R_{s12}(\theta_1) = \left[\frac{\cos\theta_1 - \sqrt{\eta^2 - \sin^2\theta_1}}{\cos\theta_1 + \sqrt{\eta^2 - \sin^2\theta_1}}\right]^2, \quad (2)$$

where n=is the index of refraction.

Equation 1 may be used to determine an example reflection factor of 0.00849 at a 45 degree incidence angle. Table 1 shows the ghost image luminance based on a display luminance of 1000 nits. A ghost image luminance of 0.5 nits is barely discernable to the viewer 106. If the antireflection film is used on the first side 112 of the transmissive dihedral corner reflector array 110a, the ghost image luminance may be reduced further by a factor of 10.

TABLE 1

| Ray ID | Factor | Nits |
| --- | --- | --- |
| R1 | 1 | 1000 |
| R5 | 0.5 | 500 |
| R7 | 0.366876 | 183.4382 |
| R9 | 0.00849 | 1.55739 |
| R10 | 0.36876 | 0.574303 |
| R13 | 0.9 | 0.516873 |

The ray R9 is reflected by the dihedral mirrors, depicted as mirror M2, toward the viewer 106 as a ray R10. The ray R10 passes out of the transmissive dihedral corner reflector array 110a as a ray R11, out of the reflective polarizer 120 as a ray R12, and finally out of the first quarter-wave retarder 130 as a ray R13. The ray R13 may convey a ghost image 204a of the first image 146. The ghost image 204a may be presented to the viewer 106.

Figure 5:
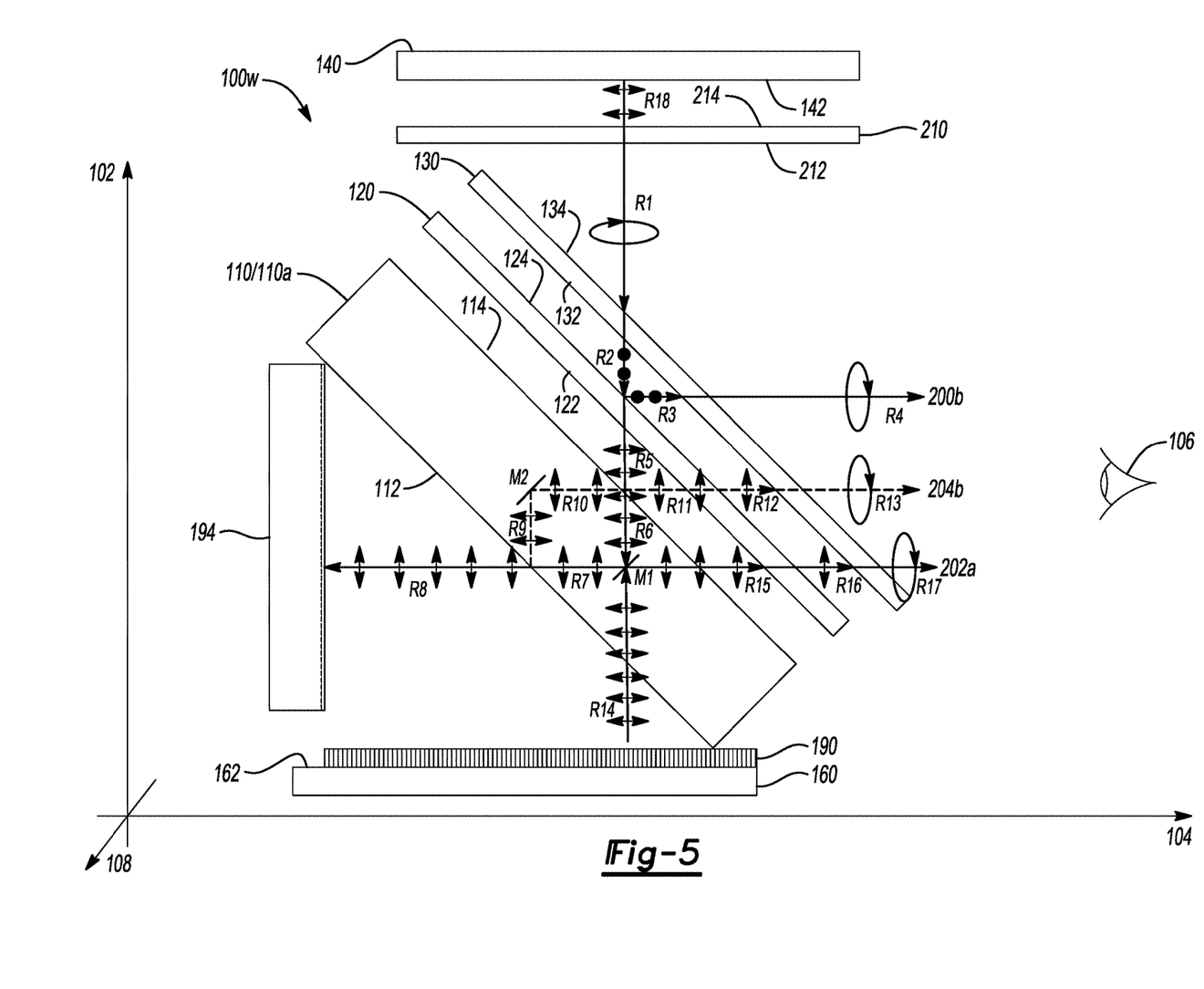
FIG. 5 illustrates a ray trace schematic of a second floating-information display in accordance with one or more exemplary embodiments.

FIG. 5 illustrates an example ray trace schematic of a second floating-information display 100w in accordance with one or more exemplary embodiments. The second floating-information display 100w may be representative of one or more of the displays 100a-100c. The second floating-information display 100w may be a variation of the first floating-information display 100v. The second floating-information display 100w generally includes the optical plate 100/transmissive dihedral corner reflector array 110a, the reflective polarizer 120, the first quarter-wave retarder 130, the first display 140, the second display 160, the film 190, the light trap 194, and a second quarter-wave retarder 210. The components are shown arranged relative to the first axis 102, the second axis 104, and a third axis 108. The third axis 108 may be orthogonal to the first axis 102 and the second axis 104. Spacing is shown between the optical elements for easier explanation of the ray traces. The refraction angles are not depicted for simplicity.

The second quarter-wave retarder 210 implements another quarter-wave plate. The second quarter-wave retarder 210 is operational to change polarization of the light passing through. Where the light enters the second quarter-wave retarder 210 with a linear polarization, the light leaves the second quarter-wave retarder 210 with a circular polarization. Where the light enters the second quarter-wave retarder 210 with a circular polarization, the light leaves the second quarter-wave retarder 210 with a linear polarization.

The second quarter-wave retarder 210 is between the first display 140 and the first quarter-wave retarder 130. The second quarter-wave retarder 210 has a seventh side (or surface) 212 and an eighth side (or surface) 214. The seventh side 212 is opposite the eighth side 214. The seventh side 212 faces the reflective polarizer 120. The eighth side 214 faces the first display 140.

The second quarter-wave retarder 210 may be laminated to the first face 142 of the first display 140 with a slow axis at 45 degrees relative to the polarization of the first display 140. A ray R18 emitted by the first display 140 with the vertical polarization is converted to the ray R1 with the circular polarization. If the slow axis of the first quarter-wave retarder 130 is aligned to the slow axis of the second quarter-wave retarder 210, a half plate retarder is formed and the ray R2 becomes substantially polarized, but with a polarization angle at 90 degrees relative to the ray R18, as shown by the black dots. Therefore, up to 99 percent of the light in the ray R2 may be reflected by the reflective polarizer 120 to the viewer 106 as the first display image 200b. As a result, the first display image 200b is approximately twice as bright as the first display image 200a (FIG. 4). Almost no light (<1% intensity) of the ray R2 is transmitted through the reflective polarizer 120 as the ray R5. The low light level in the ray R5 results in a substantially reduced ghost image 204b relative to the ghost image 204a (FIG. 4).

The ray R14 emitted from the second display 160 is vertically polarized and strikes the dihedral mirrors, shown schematically by M1. Polarization is preserved and the ray R14 is transformed into a ray R15. The ray R15 passes through the reflective polarizer 120 with up to a 90 percent transmission rate to become a ray R16. The ray R16 subsequently passes through the first quarter-wave retarder 130 and becomes circularly polarized as a ray R17. The ray R17 conveys the second display image 202a to the viewer 106, same as in the first floating-information display 100v.

The film 190 may help minimize a ghost image of the second image 166 caused the transmissive dihedral corner reflector array 110a. Louvers of the film 190 may be oriented to restrict the light output from spreading along the second axis 104. An additional film 190 (not shown) may be added to restrict light from spreading along the third axis 108 to minimize the ghost images further.

From a transmission aspect, Table 2 illustrates the measured/estimated transmission data of the second display 160.

TABLE 2

| Ray ID | Factor | Nits |
| --- | --- | --- |
| None | | 1000 |
| R14 | 0.72 | 716.22 |
| R15 | 0.37 | 262.76 |
| R16 | 0.9 | 236.49 |
| R17 | 1 | 236.49 |

The loss in luminance is primarily due to the transmissive dihedral corner reflector array 110a and therefore the second display 160 may be operated at a high luminance to compensate.

Figure 6:
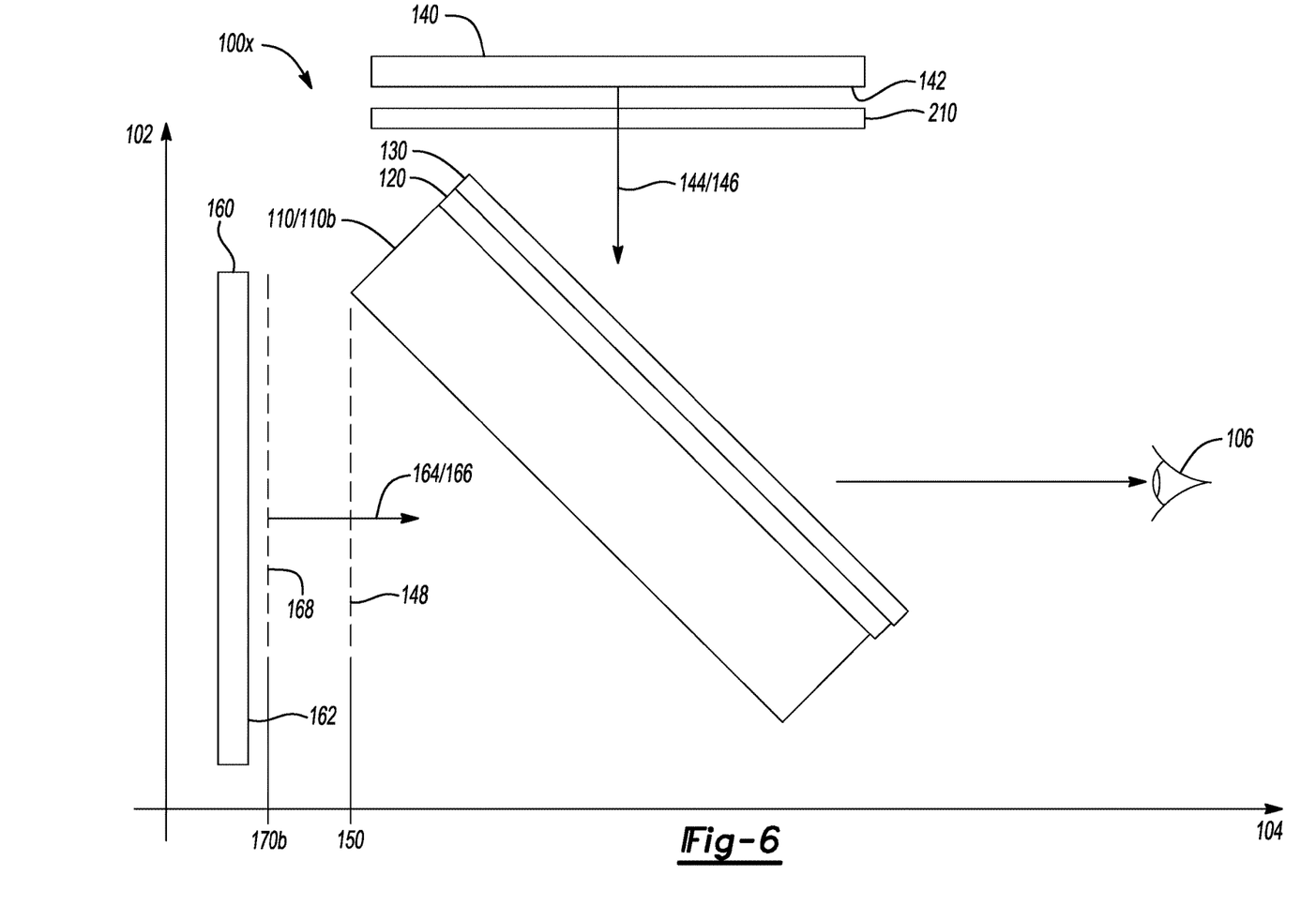
FIG. 6 illustrates a third floating-information display in accordance with one or more exemplary embodiments.

FIG. 6 illustrates an example embodiment of a third floating-information display 100x in accordance with one or more exemplary embodiments. The third floating-information display 100x may be representative of one or more of the displays 100a-100c. The third floating-information display 100x may be a variation of the second floating-information display 100w and/or the first floating-information display 100v. Orientation of the third floating-information display 100x is described in terms of the first axis 102 and the second axis 104. The third floating-information display 100x produces a pseudo three-dimensional display image using the reflective polarizer 120 and the first quarter-wave retarder 130 in a similar manner is shown in FIG. 2. A spatial disparity of the image planes at the locations 150 and 170b for the first display 140 and the second display 160 may be used to create a three-dimensional effect.

The third floating-information display 100x includes the optical plate 110, the reflective polarizer 120, the first quarter-wave retarder 130, the first display 140, the second display 160, and the second quarter-wave retarder 210. The optical plate 110 may implement a clear plate 110b. The second display 160 may be rotated relative to FIG. 2 and aligned normal to the second axis 104.

The second light 164/second image 166 may pass from the second display 160 through clear plate 110b and on to the viewer 106. Therefore, the second floating image 168 may be seen by the viewer 106 at the second location 170b. The second location 170b may be at the second face 162 of the second display 160. The second floating image 168 at the second location 170b is further from the viewer 106 than the first floating image 148 at the first location 150. By appropriately positioning the second display 160 along the second axis 104, the first floating image 148 and the second floating image 168 may create a three-dimensional image.

Figure 7:
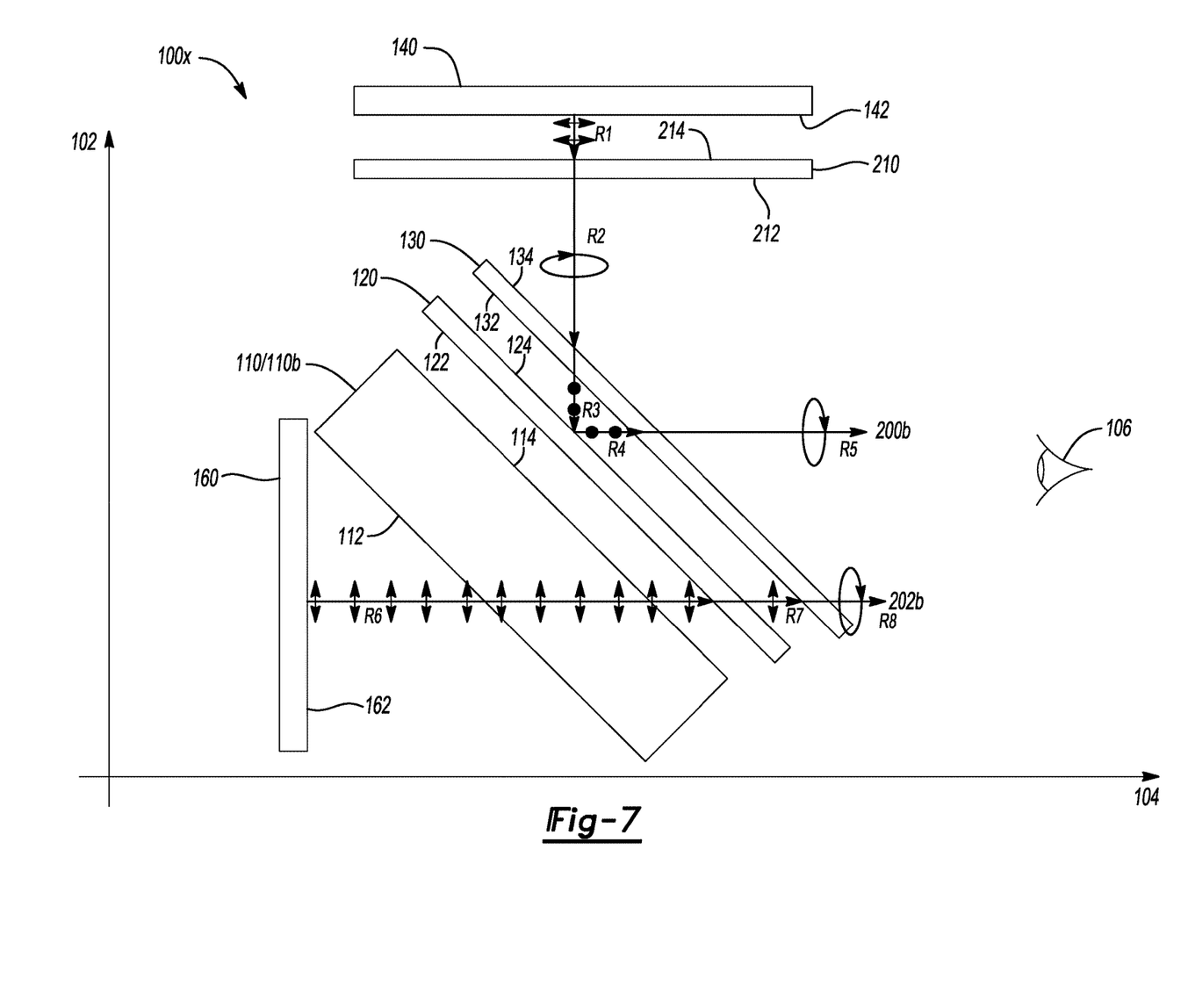
FIG. 7 illustrates a ray trace schematic of the third floating-information display in accordance with one or more exemplary embodiments.

FIG. 7 illustrates an example ray trace schematic of the third floating-information display 100x in accordance with one or more exemplary embodiments. The third floating-information display 100x generally includes the optical plate 110/clear plate 110b, the reflective polarizer 120, the first quarter-wave retarder 130, the first display 140, the second display 160, and the second quarter-wave retarder 210. The components are shown arranged relative to the first axis 102 and the second axis 104. Spacing is shown between the optical elements for easier explanation of the ray traces. The refraction angles are not depicted for simplicity.

The use of two displays and a semi-transparent mirror has been used in the past to produce a pseudo three-dimensional display, but at considerable loss in display luminance since the semi-transparent mirror reflects only a portion of the front display luminance and transmits only a portion of the rear display luminance. With the third floating-information display 100x, a larger portion of the display luminance is now presented to the viewer 106.

The second display 160 generates the second image 166 in a ray R6. The ray R6 is vertically polarized, as is typical with in-plane-switching displays used in the automotive industry. Since the polarization axis of the ray R6 is aligned to the transmission axis of the reflective polarizer 120, up to 90 percent of the ray R6 is transmitted through the reflective polarizer 120 as a ray R7. The ray R7 is subsequently transformed into a ray R8 with circularly polarized light by the first quarter-wave retarder 130. The ray R8 conveys a second display image 202b to the viewer 106. The second display image 202b may be brighter than the second display image 202a (FIGS. 4 and 5) in the absence of the dihedral mirrors (e.g., M1). Circularly polarized light may be preferred by the viewer 106 since the luminance remains constant as a head of the viewer 106 turns left or right from center while wearing polarized sun glasses.

A vertically polarized ray R1 is generated by the first display 140. The ray R1 is transformed into a circularly polarized light ray R2 via the second quarter-wave retarder 210. The ray R2 passes through first quarter-wave retarder 130 and is transformed into a ray R3. The ray R3 is substantially linearly polarized light, but with a polarization axis that is at 90 degrees relative to the polarization axis of the ray R1. Since the polarization of the ray R3 is oriented with the reflection axis of the reflective polarizer 120, almost all of the light is reflected as a ray R4. The ray R4 is subsequently converted into circularly polarized light as a ray R5 via the first quarter-wave retarder 130. A reason that the first quarter-wave retarder 130 is not combined with the second quarter-wave retarder 210 to form a half-wave plate is that the light reflected by the reflective polarizer 120 would not be visible (blocked) if the viewer 106 is wearing polarized sun glasses since most polarized sunglasses have a vertical transmission axis.

Figure 8:
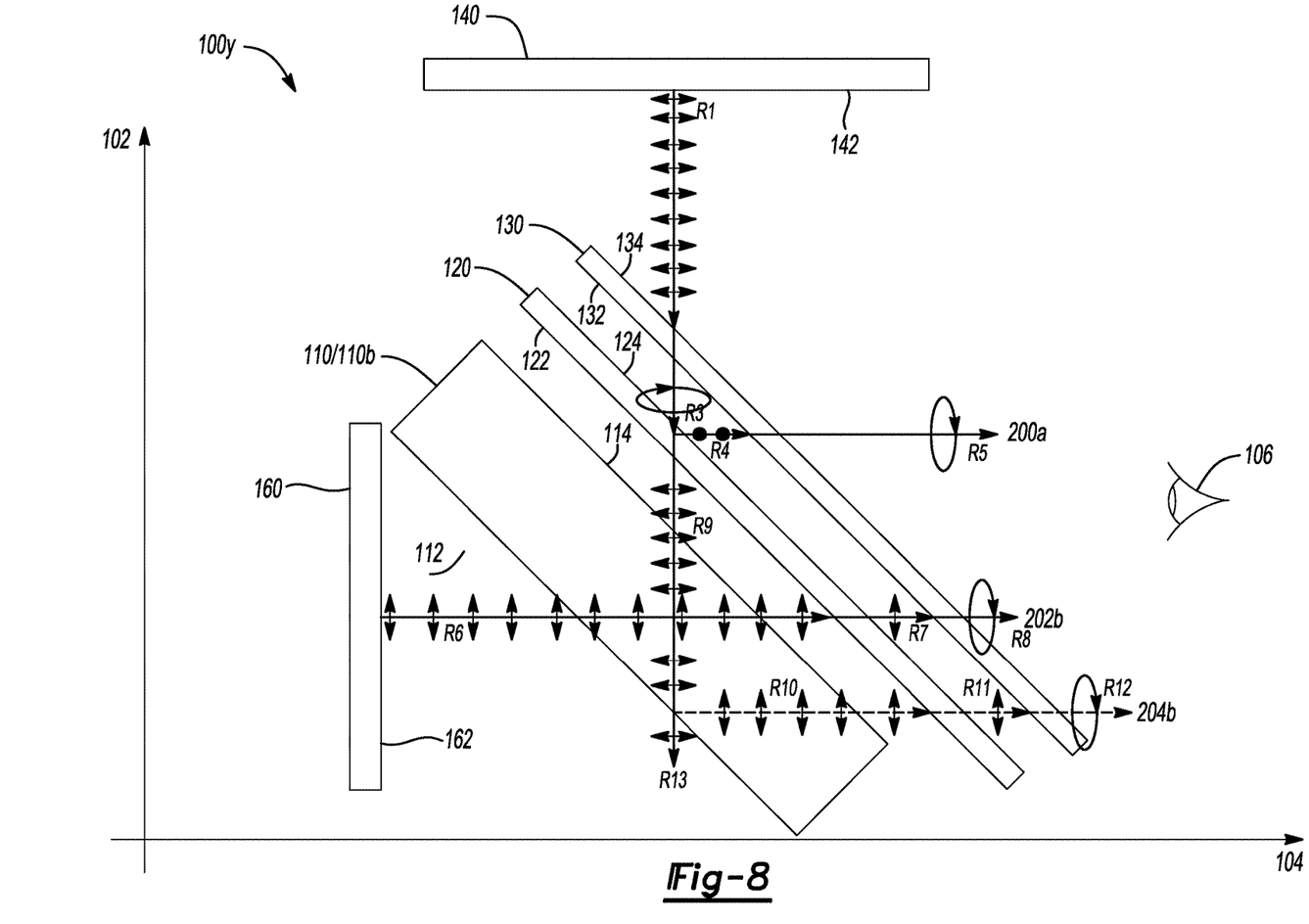
FIG. 8 illustrates a ray trace schematic of a fourth floating-information display in accordance with one or more exemplary embodiments.

FIG. 8 illustrates an example ray trace schematic of a fourth floating-information display 100y in accordance with one or more exemplary embodiments. The fourth floating-information display 100y generally includes the optical plate 110/clear plate 110b, the reflective polarizer 120, the first quarter-wave retarder 130, the first display 140, and the second display 160. The fourth floating-information display 100y may be a variation of the third floating-information display 100x. The components are shown arranged relative to the first axis 102 and the second axis 104. Spacing is shown between the optical elements for easier explanation of the ray traces. The refraction angles are not depicted for simplicity.

The first display 140 generates the first image 146 in a ray R1 with the vertical polarization. The ray R1 passes through the first quarter-wave retarder 130 and is transformed into substantially circular polarization as a ray R3. Approximately half the circularly polarized light from the ray R3 passes through the reflective polarizer 120 as a ray R9. The other half of the ray R3 is reflected by the reflective polarizer 120 as a ray R4. The ray R4 is horizontally polarized light (e.g., polarized 90 degrees relative to the vertical polarization) that passes through the first quarter-wave retarder 130 and is transformed into substantially circularly polarized light as a ray R5. The ray R5 continues on to the viewer 106 as the first display image 200a.

The ray R9 is transmitted in through the second side 114 of the clear plate 110b and through to the first side 112 of the clear plate 110b. Since the light of the ray R9 was vertically polarized by the reflective polarizer 120, some light is reflected at the first side 112 as a ray R10 while most of the light is transmitted through the first side 112 as a ray R13. The ray R10 passes out of the clear plate 110b and through the reflective polarizer 120. The ray R10 continues through the reflective polarizer 120 as a ray R11, and subsequently through the first quarter-wave retarder 130 as a ray R12. The ray R12 continues to the viewer 106 and conveys a ghost image 204b.

The ghost image 204b from the ray R12 is dim since the reflectance factor is about 0.00849 at the first side 112 of the clear plate 110b. If the light would not have been vertically polarized by the reflective polarizer 120, a much higher amount of light would be reflected by the first side 112 and be observed as a brighter ghost image 204b.

Those having ordinary skill in the art will recognize that terms such as "above," "below," "front," "back," "upward," "downward," "top," "bottom," etc., may be used descriptively herein without representing limitations on the scope of the disclosure. Furthermore, the present teachings may be described in terms of functional and/or logical block components and/or various processing steps. Such block components may be comprised of various hardware components, software components executing on hardware, and/or firmware components executing on hardware.

The foregoing detailed description and the drawings are supportive and descriptive of the disclosure, but the scope of the disclosure is defined solely by the claims. As will be appreciated by those of ordinary skill in the art, various alternative designs and embodiments may exist for practicing the disclosure defined in the appended claims.

The invention claimed is:

1. A floating-information display comprising:
an optical plate that has a first side and a second side opposite the first side;
a first quarter-wave retarder disposed on the second side of the optical plate;
a reflective polarizer disposed between the first quarter-wave retarder and the second side of the optical plate;
a first display disposed on the second side of the optical plate and aligned with the first quarter-wave retarder, wherein the first display is configured to transmit a first image along a first axis through the first quarter-wave retarder to the reflective polarizer, the reflective polarizer is configured to redirect the first image along a second axis through the first quarter-wave retarder toward a viewer, the first image appears to the viewer to be oriented normal to the second axis and at a first location on the first side of said optical plate, and the second axis is orthogonal to the first axis; and
a second display disposed on the first side of the optical plate and aligned with the optical plate, wherein the second display is configured to transmit a second image to the first side of the optical plate, the second image is transferred through the first quarter-wave retarder along the second axis toward the viewer, the second image appears to the viewer to be oriented normal to the second axis and at a second location, and the second location of the second image is spatially offset from the first location of the first image.

2. The floating-information display according to claim 1, wherein the optical plate is configured to generate a ghost image by an internal reflection of the first image on the first side of the optical plate, the ghost image is presented out of the first quarter-wave retarder along the second axis toward the viewer, and a polarization of light that forms the first image while in the optical plate causes an intensity of the ghost image to be less than 1 percent of the first image as seen by the viewer.

3. The floating-information display according to claim 1, wherein a polarization of light that forms the first image and reaches the reflective polarizer through the first quarter-wave retarder causes the first image to be reflected by at least 50 percent by the reflective polarizer toward the viewer.

4. The floating-information display according to claim 1, wherein a polarization of light that forms the second image and reaches the reflective polarizer through the optical plate causes the second image to be transferred by at least 90 percent through the reflective polarizer toward the viewer.

5. The floating-information display according to claim 1, wherein the optical plate is a clear plate, the second display has a face that is oriented normal to the second axis, the second location of the second image appears to the viewer to be at a second face of the second display, and the first location of the first image is between the second location and the clear plate.

6. The floating-information display according to claim 1, wherein the optical plate is a transmissive dihedral corner reflector array, the second display has a face that is oriented normal to the first axis, and the second location of the second image is between the transmissive dihedral corner reflector array and the viewer.

7. The floating-information display according to claim 1, wherein the first image and the second image are circularly polarized upon leaving the first quarter-wave retarder toward the viewer.

8. The floating-information display according to claim 7, wherein a ghost image of the first image generated by a reflection internal to the optical plate is circularly polarized upon leaving the first quarter-wave retarder toward the viewer.

9. The floating-information display according to claim 1, further comprising a second quarter-wave retarder disposed between the first quarter-wave retarder and the first display, oriented normal to the first axis, and configured to change a polarization of the first image, wherein the reflective polarizer reflects at least 99 percent of the first image toward the viewer.

10. The floating-information display according to claim 1, further comprising a film disposed on the second display and configured to restrict a light of the second image to within approximately 20 degrees from the first axis.

11. A method for generating two images with a floating-information display, the method comprising:
transmitting a first image from a first display along a first axis through a first quarter-wave retarder to a reflective polarizer, wherein the first quarter-wave retarder is disposed on a second side of an optical plate, the optical plate has a first side and the second side that is opposite the first side, the reflective polarizer is disposed between the first quarter-wave retarder and the second side of the optical plate, and the first display is disposed on the second side of the optical plate and aligned with the first quarter-wave retarder;
redirecting the first image with the reflective polarizer along a second axis through the first quarter-wave retarder toward a viewer, wherein the first image appears to the viewer to be oriented normal to the second axis and at a first location on the first side of said optical plate, and the second axis is orthogonal to the first axis;
transmitting a second image from a second display to the first side of the optical plate, wherein the second display is disposed on the first side of the optical plate and is aligned with the optical plate; and
transferring the second image through the first quarter-wave retarder along the second axis toward the viewer, wherein the second image appears to the viewer to be oriented normal to the second axis and at a second location, and the second location of the second image is spatially offset from the first location of the first image.

12. The method according to claim 11, further comprising:
generating a ghost image by an internal reflection of the first image on the first side of the optical plate, the ghost image is presented out of the first quarter-wave retarder along the second axis toward the viewer, and a polarization of light that forms the first image while in the optical plate causes an intensity of the ghost image to be less than 1 percent of the first image as seen by the viewer.

13. The method according to claim 11, wherein a polarization of light that forms the first image and reaches the reflective polarizer through the first quarter-wave retarder causes the first image to be reflected by at least 50 percent by the reflective polarizer toward the viewer.

14. The method according to claim 11, wherein a polarization of light that forms the second image and reaches the reflective polarizer through the optical plate causes the second image to be transferred by at least 90 percent through the reflective polarizer toward the viewer.

15. The method according to claim 11, wherein the optical plate is a clear plate, the second display has a face that is oriented normal to the second axis, the second location of the second image appears to the viewer to be at a second face of the second display, and the first location of the first image is between the second location and the clear plate.

16. The method according to claim 11, wherein the optical plate is a transmissive dihedral corner reflector array, the second display has a face that is oriented normal to the first axis, and the second location of the second image is between the transmissive dihedral corner reflector array and the viewer.

17. The method according to claim 11, wherein the first image and the second image are circularly polarized upon leaving the first quarter-wave retarder toward the viewer.

18. The method according to claim 17, wherein a ghost image of the first image generated by a reflection internal to the optical plate is circularly polarized upon leaving the first quarter-wave retarder toward the viewer.

19. The method according to claim 11, wherein a second quarter-wave retarder is disposed between the first quarter-wave retarder and the first display, oriented normal to the first axis, and configured to change a polarization of the first image, the method further includes:

reflecting at least 99 percent of the first image toward the viewer with the reflective polarizer.

20. An instrument panel comprising:
an electronic control unit; and
a floating-information display in electrical communication with the electronic control unit, wherein the floating-information display includes:
an optical plate that has a first side and a second side opposite the first side;
a first quarter-wave retarder disposed on the second side of the optical plate;
a reflective polarizer disposed between the first quarter-wave retarder and the second side of the optical plate;
a first display disposed on the second side of the optical plate and aligned with the first quarter-wave retarder, wherein the first display is configured to transmit a first image along a first axis through the first quarter-wave retarder to the reflective polarizer, the reflective polarizer is configured to redirect the first image along a second axis through the first quarter-wave retarder toward a viewer, the first image appears to the viewer to be oriented normal to the second axis and at a first location on the first side of said optical plate, and the second axis is orthogonal to the first axis; and
a second display disposed on the first side of the optical plate and aligned with the optical plate, wherein the second display is configured to transmit a second image to the first side of the optical plate, the second image is transferred through the first quarter-wave retarder along the second axis toward the viewer, the second image appears to the viewer to be oriented normal to the second axis and at a second location, and the second location of the second image is spatially offset from the first location of the first image.

* * * * *